United States Patent [19]
Tanaka et al.

[11] Patent Number: 5,528,438
[45] Date of Patent: Jun. 18, 1996

[54] DRUM ASSEMBLY HAVING A LOWER FIXED DRUM AND AN UPPER ROTARY DRUM WITH A PARTICULARLY SHAPED OUTER SURFACE

[75] Inventors: Seiki Tanaka; Takashi Sasaya; Shougo Uehara, all of Kanagawa, Japan

[73] Assignee: Sony Corporation, Tokyo, Japan

[21] Appl. No.: 37,425

[22] Filed: Mar. 26, 1993

[30] Foreign Application Priority Data

Mar. 30, 1992 [JP] Japan .................................. 4-102543

[51] Int. Cl.$^6$ ........................... G11B 15/61; G11B 5/52; G11B 5/53
[52] U.S. Cl. ...................... 360/107; 360/84; 360/130.24
[58] Field of Search ..................... 360/107, 84, 130.22, 360/130.23, 130.24

[56] References Cited

U.S. PATENT DOCUMENTS

| | | | |
|---|---|---|---|
| 4,314,284 | 2/1982 | Sato et al. ............................... | 360/107 |
| 4,316,225 | 2/1982 | Maruyama et al. ...................... | 360/84 |
| 4,517,615 | 5/1985 | Hino ...................................... | 360/130.24 |
| 4,719,528 | 1/1988 | Sato ...................................... | 360/130.24 |
| 5,021,908 | 6/1991 | Morimoto et al. ...................... | 360/84 |
| 5,060,104 | 10/1991 | Kitaori et al. ......................... | 360/130.24 |

FOREIGN PATENT DOCUMENTS

| | | | |
|---|---|---|---|
| 0090375 | 10/1983 | European Pat. Off. ................. | 360/84 |
| 2-249168 | 10/1990 | Japan .................................. | 360/130.24 |
| 3-224156 | 10/1991 | Japan .................................. | 360/130.24 |

*Primary Examiner*—Stuart S. Levy
*Assistant Examiner*—Craig A. Renner
*Attorney, Agent, or Firm*—William S. Frommer; Alvin Sinderbrand

[57] ABSTRACT

A rotary bead-drum assembly for use in a video tape recorder that makes high-density recording. The assembly comprises a rotating top drum and a stationary bottom drum. Magnetic tape is helically wound on the outer surfaces of the two drums. A plurality of magnetic transducing heads are mounted to the top drum. An upward conical surface is formed on the top drum over the heads to make the elongation coefficient of the lateral extent of the tape uniform.

3 Claims, 5 Drawing Sheets

1

DRUM ASSEMBLY HAVING A LOWER FIXED DRUM AND AN UPPER ROTARY DRUM WITH A PARTICULARLY SHAPED OUTER SURFACE

FIELD OF THE INVENTION

The present invention relates to a rotary head-drum assembly adapted for use in a video tape recorder making high-density recording and, more particularly, to a rotary head-drum assembly having a rotating top drum.

BACKGROUND OF THE INVENTION

A conventional rotary head-drum assembly having a rotating top drum and adapted for use in a video tape recorder making high-density recording is described in Japanese Utility Model Laid-Open No. 89449/1984.

As shown in FIGS. 3 and 4, this conventional rotary head-drum assembly comprises a rotating top drum 2 and a stationary bottom drum 4. Both drums 2 and 4 are mounted on the same axis. A plurality of magnetic transducing heads 1 are mounted near the lower end of the outer surface of the rotary drum 2. A helical guide band 3 is formed on the outer periphery of the fixed drum 4. The diameter $D_1$ of the rotary drum 2 is set larger than the diameter $D_2$ of the fixed drum 4.

Magnetic tape 5 is wound helically on the outer surfaces of the drums 2 and 4. The rotary drum 2 is rotated, for example, in the direction indicated by the arrow b while moving the tape 5 helically, for example, in the direction indicated by the arrow a along the guide band 3. Thus, as shown in FIG. 5, the plural heads 1 record or play back slanted recording tracks TR on the tape 5.

In this kind of rotary head-drum assembly, the magnetic tape 5 is in contact with the assembly for about 210°. Head switch occurs at every 180°. Therefore, the heads 1 comprise some pairs of heads. In each pair, two heads are mounted in a diametrically opposite relation to each other. The heads 1 comprise a pair of recording heads, a pair of video playback heads, a pair of audio playback heads, and a pair of erase heads.

As is well known in the art, in the rotary head-drum assembly of this kind, an air layer 8 which gradually decreases in thickness from the side of the entrance 6 of the drum assembly to the side of the exit 7 of the drum assembly is formed between the rotary drum 2 and the tape 5, as indicated by the hatching in FIG. 4. In the rotary head-drum assembly of a video tape recorder making high-density recording, the rotary drum 2 rotates at a very high frequency of 90 Hz and so the air layer 8 is very thick. Especially, on the side of the entrance 6 of the drum assembly, the layer 8 is as thick as 30 to 40 μm.

Furthermore, in the above-described prior art rotary head-drum assembly, the diameter $D_1$ of the rotating upper drum 2 is set larger than the diameter $D_2$ of the stationary lower drum 4. Therefore, as shown in FIG. 5, the length $L_1$ of the portion of the upper edge 5a of the tape 5 which is wound around the rotary drum 2 via the air layer 8 is larger than the length $L_2$ of the portion of the lower edge 5b of the tape that is wound on the fixed drum 4 between the entrance 6 and the exit 7 of the drum assembly. This makes it impossible to make uniform the distribution of the elongation coefficient in the direction of the width indicated by W. The coefficient is the percentage of the elongation of the length $L_1$ of the wound portion of the upper edge 5a of the tape relative to the length $L_2$ of the wound portion of the lower edge 5b of the tape, i.e., $$\frac{L_1 - L_2}{L_2} \times 100(\%)$$

Therefore, in the prior art rotary head-drum assembly, the air layer 8 at the side of the entrance 6 of the drum assembly is thick, and the length $L_1$ of the wound portion of the upper edge 5a of the tape 5 is increased. Consequently, the heads 1 are pressed into the tape 5 with reduced force at the side of the entrance 6 of the drum assembly. This reduces the head output power.

SUMMARY OF THE INVENTION

It is an object of the present invention to provide a rotary head-drum assembly capable of making uniform the elongation coefficient of the lateral extent of magnetic tape which is wound helically on the outer surface of the rotary drum and on the outer surface of the fixed drum.

It is another object of the invention to provide a rotary head-drum assembly which permits magnetic tape to travel stably along the guide band.

It is a further object of the invention to provide a rotary head-drum assembly which reduces the damage to magnetic tape caused by the contact of the tape with the rotating top drum to thereby increase the life of the tape.

These objects are achieved in accordance with the teachings of the invention by a cylindrical rotary head-drum assembly around which magnetic tape is pulled, said rotary head-drum assembly comprising: a rotating top drum which has video heads for reading and recording a video signal on the tape and around which the tape is wound; a stationary bottom drum around which the tape is wound; a cylindrical surface which is formed on the top drum and on which the heads are mounted; and an upward conical surface formed on the top drum and starting at one end of the cylindrical surface.

In one aspect of the invention, the diameter of the cylindrical surface on the rotating top drum is greater than that of the stationary bottom drum.

In another aspect of the invention, the rotating top drum further includes a downward conical surface extending from the other end of the cylindrical surface to the bottom drum.

In a further aspect of the invention, the diameter of the lower edge of the downward conical surface is equal to or greater than that of the bottom drum.

The invention also lies in a rotary head-drum assembly around which magnetic tape is pulled, said rotary head-drum assembly comprising: a rotating top drum which has video heads for reading and recording a video signal on the tape and around which the tape is wound; a stationary bottom drum around which the tape is wound; a cylindrical surface which is formed on the top drum and on which the heads are mounted, the diameter of the cylindrical surface being greater than that of the bottom drum; an upward conical surface formed on the top drum and starting at one end of the cylindrical surface; and a downward conical surface extending from the other end of the cylindrical surface to the bottom drum, the diameter of the lower edge of the downward conical surface being equal to or greater than that of the bottom drum.

Other objects and features of the invention will appear in the course of the description thereof which follows.

DETAILED DESCRIPTION OF THE INVENTION

Figure 1:
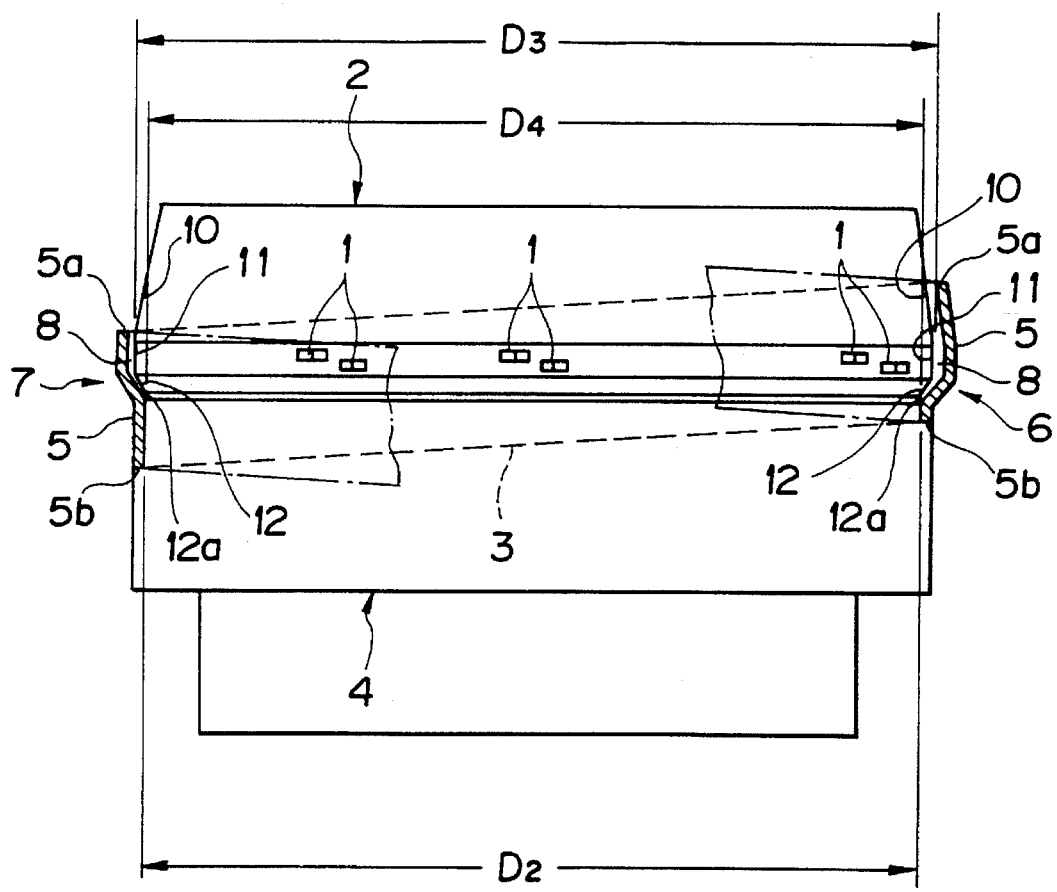
FIG. 1 is a side elevation of a rotary head-drum assembly according to the invention.
Figure 2:
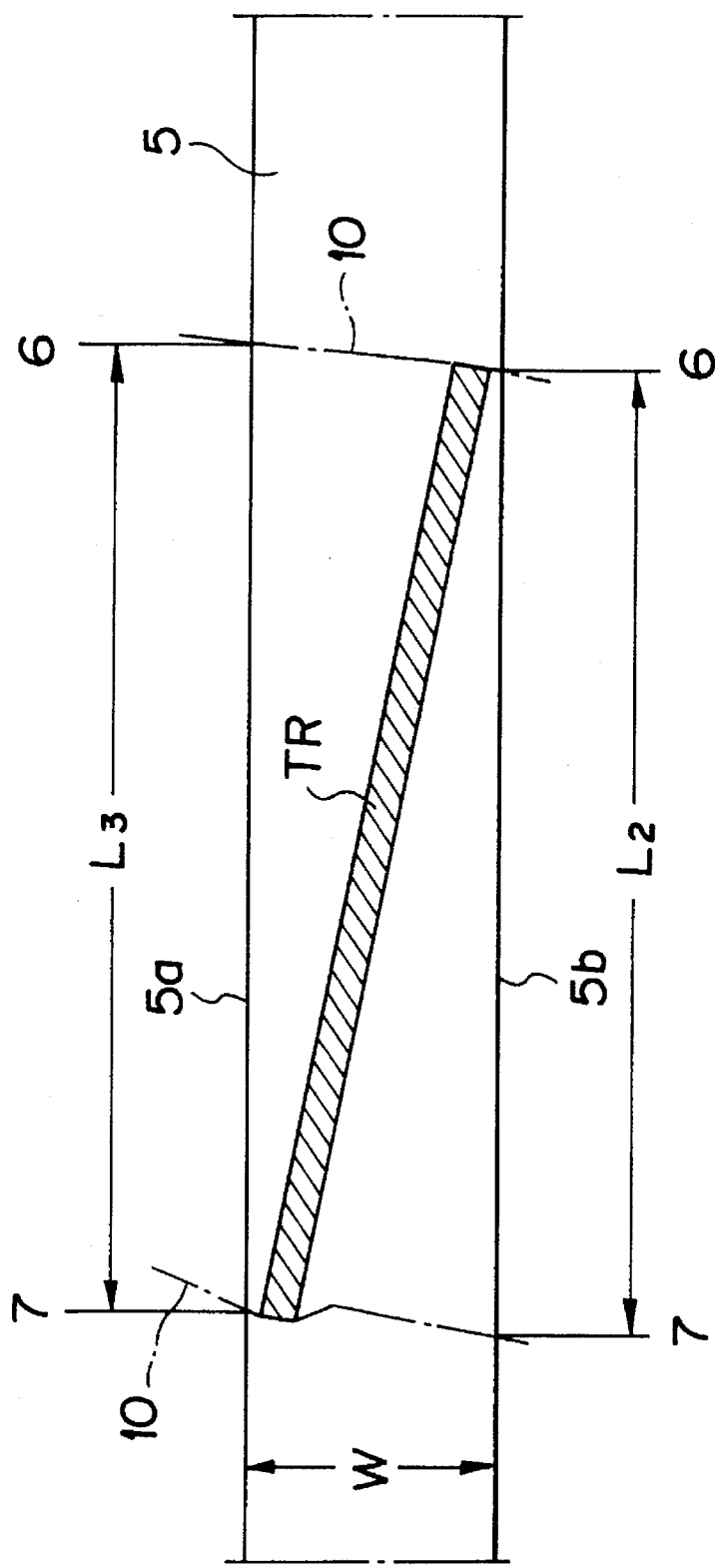
FIG. 2 is a diagram illustrating the elongation coefficient of the lateral extent of magnetic tape on the rotary head-drum assembly shown in FIG. 1.
Figure 3:
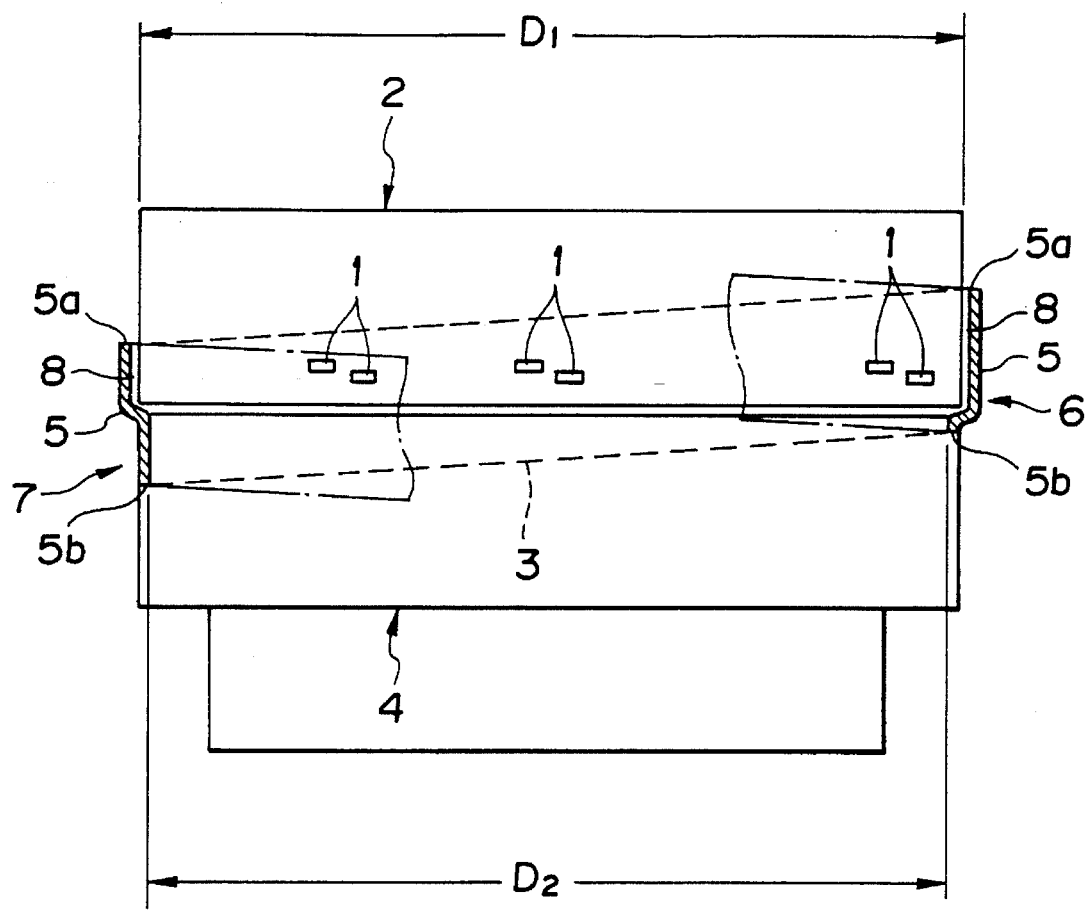
FIG. 3 is a side elevation of the prior art rotary head-drum assembly.
Figure 4:
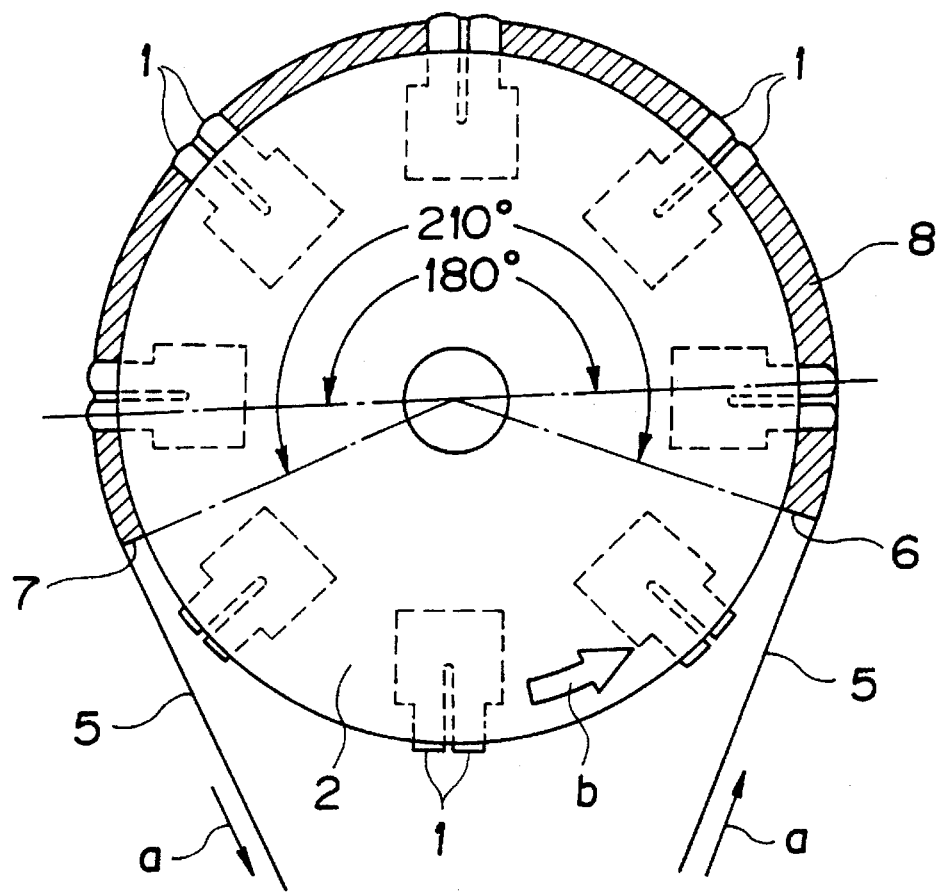
FIG. 4 is a plan view illustrating the air layer formed in the prior art rotary head-drum assembly shown in FIG. 3.
Figure 5:
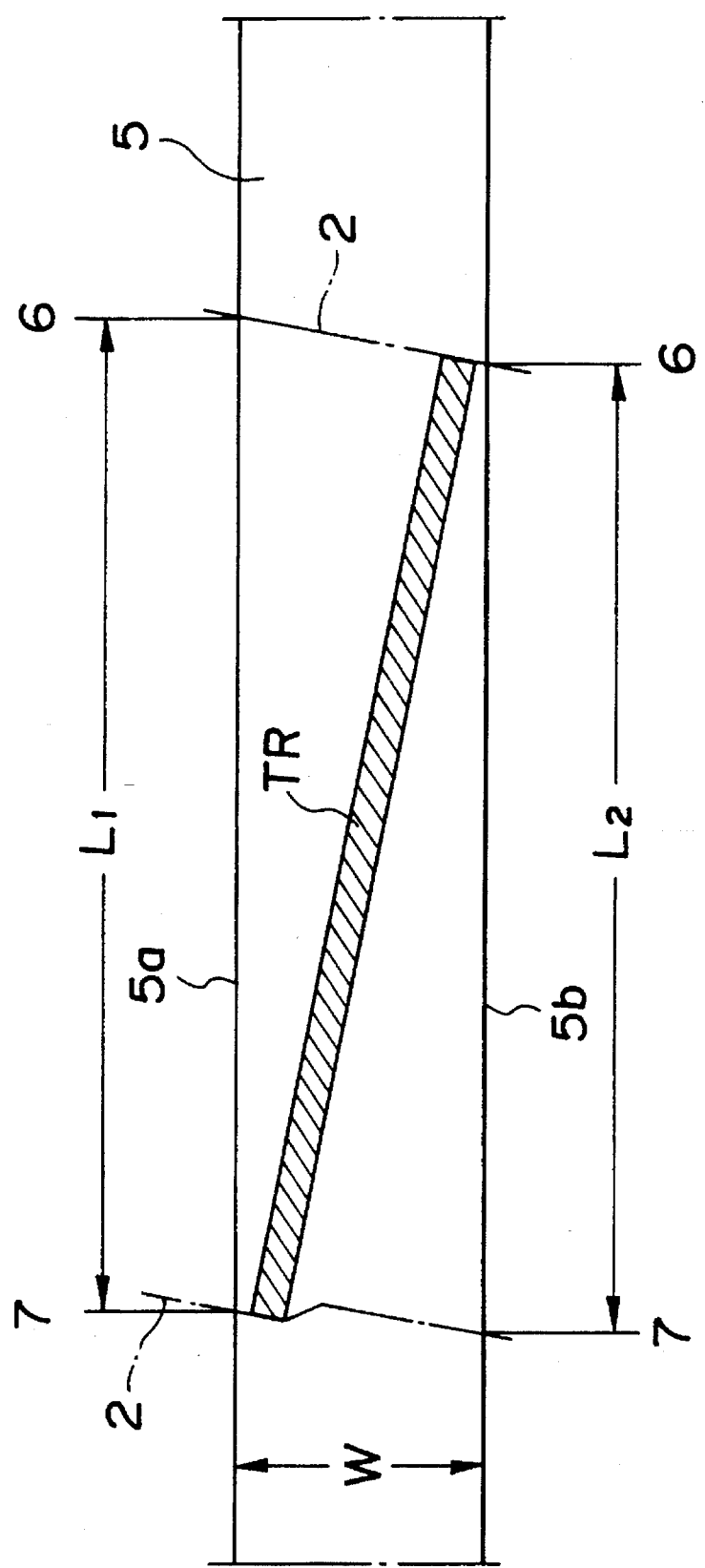
FIG. 5 is a diagram illustrating the elongation coefficient of the lateral extent of magnetic tape on the prior art rotary head-drum assembly shown in FIG. 3.

Referring to FIGS. 1 and 2, there is shown a rotary head-drum assembly embodying the concept of the present invention, the assembly having a rotating top drum. It is to be noted that like components are indicated by like reference numerals in various figures. This assembly is used in a video tape recorder making high-density recording.

Referring first to FIG. 1, the rotating top drum, indicated by 2, has an upward conical surface 10 formed on the outer surface of the rotary drum 2 over a plurality of magnetic transducing heads 1. The diameter of this conical surface 10 gradually decreases upwardly. The outer surface of the top drum or upper drum 2 has a cylindrical surface 11 of right circular cross section, the cylindrical surface 11 extending parallel to the axis of the rotary drum 2. The magnetic transducing heads 1 are mounted on this cylindrical surface 11. A downward conical surface 12 which gradually decreases in diameter downwardly is formed on the outer surface of the rotating drum below the heads 1. Let $D_2$ be the diameter of the stationary bottom drum 4. Let $D_3$ be the diameter of the cylindrical surface 11. Let $D_4$ be the diameter of the downward conical surface 12 at the lower edge 12a. These diameters have the relations given by $$D_2 < D_3 \text{ and } D_2 \leq D_4$$

In the rotary head-drum assembly constructed as described above, magnetic tape 5 is coiled helically around the outer surfaces of both drums 2 and 4. The tape 5 is made to travel in a helical path along a guide band 3. At the same time, the top drum 2 is rotated at a high speed to read or record a video signal on the tape 5. At this time, as shown in FIG. 2, the upward conical surface 10 formed on the rotary drum 2 balances the length $L_3$ of the portion of the upper edge 5a of the tape 5 wrapped around the rotary drum 2 via the air layer 8 against the length $L_2$ of the portion of the lower edge 5b wound on the fixed drum 4. This makes uniform the elongation coefficient of the tape 5 in the direction of the width W. Consequently, the magnetic transducing heads 1 can press into the magnetic tape 5 with greater stability and with greater uniformity between the entrance 6 and the exit 7 of the drum assembly. Thus, decrease in the head output can be prevented.

The relation between the diameter $D_2$ of the fixed drum and the diameter $D_3$ of the cylindrical surface 11 of right circular cross section is so set as to satisfy the relation $D_2 < D_3$. This assures that the tape 5 is urged downward during movement of the tape. Furthermore, this assures that the lower edge 5b of the tape 5 is maintained in contact with the guide band 3 on the stationary drum 4. In consequence, the tape 5 can travel stably. Hence, the recording tracks TR can be played back accurately.

Moreover, the downward conical surface 12 formed on the rotary drum 2 alleviates the damage to the tape caused by the contact of the lower edge 12a of the rotary drum 2 with the tape 5. This increases the life of the tape 5. Also, the reliability is improved.

While one preferred embodiment of the invention has been described, it is to be understood that the invention is not limited thereto but rather various changes and modifications can be made within the scope of the invention.

What is claimed is:

1. An apparatus having a drum assembly including an upper rotary drum and a lower fixed drum having a diameter around which a magnetic tape is wound so that a signal may be recorded on and reproduced from said magnetic tape by a plurality of transducing heads mounted on said upper rotary drum, said upper rotary drum being adapted to rotate about a rotation axis, said upper rotary drum comprising:

a first portion having a cylindrically shaped surface in which said plurality of transducing heads are mounted, said cylindrically shaped surface having ends which extend substantially parallel to said rotation axis, said first portion having a diameter greater than the diameter of said lower fixed drum;

a second portion having a truncated conical shaped part having a lower end which is coupled to one end of said first portion such that a diameter of said second portion gradually decreases upwardly from said lower end of said second portion; and a third portion having a second truncated conical shaped part successively extending from the other end of said first portion to said lower fixed drum.

2. An apparatus having a drum assembly including an upper rotary drum and a lower fixed drum having a diameter around which a magnetic tape is wound so that a signal may be recorded on and reproduced from said magnetic tape by a plurality of transducing heads mounted on said upper rotary drum, said upper rotary drum comprising:

a first portion having a cylindrically shaped surface in which said plurality of transducing heads are mounted, said first portion having a diameter greater than the diameter of said lower fixed drum;

a second portion having a truncated conical part continuous with one end of said first portion so that a diameter of said second portion is gradually decreased upwardly from said first portion; and a third portion having a second truncated conical part successively extending from the other end of said first portion to said lower fixed drum.

3. The apparatus according to claim 2, in which a minimum diameter of said third portion is equal to or greater than that of said lower fixed drum.

* * * * *